(12) United States Patent
Kim et al.

(10) Patent No.: US 12,234,171 B2
(45) Date of Patent: Feb. 25, 2025

(54) FILTER MODULE FOR WATER DISPENSING DEVICE

(71) Applicant: LG ELECTRONICS INC., Seoul (KR)

(72) Inventors: Youngjae Kim, Seoul (KR); Changhwan Yoon, Seoul (KR); Gyeonghwan Kweon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 27 days.

(21) Appl. No.: 17/569,928

(22) Filed: Jan. 6, 2022

(65) Prior Publication Data

US 2022/0212970 A1 Jul. 7, 2022

(30) Foreign Application Priority Data

Jan. 7, 2021 (KR) .......................... 10-2021-0002034

(51) Int. Cl.
*C02F 9/00* (2023.01)
*B01D 29/21* (2006.01)
(Continued)

(52) U.S. Cl.
CPC .............. *C02F 9/00* (2013.01); *B01D 29/213* (2013.01); *B01D 35/06* (2013.01); *B01D 35/301* (2013.01);
(Continued)

(58) Field of Classification Search
CPC .. C02F 9/00; C02F 1/003; C02F 1/283; C02F 1/444; C02F 1/48; C02F 2307/10;
(Continued)

(56) References Cited

U.S. PATENT DOCUMENTS

| 4,859,340 A * | 8/1989 | Hou ....................... D21H 11/22 210/508 |
| 2014/0008310 A1 | 1/2014 | Weston et al. |
| 2017/0136418 A1 | 5/2017 | Choi et al. |

FOREIGN PATENT DOCUMENTS

| AU | 2017210540 A1 * | 2/2018 | ......... B01D 39/2055 |
| CN | 2154256 | 1/1994 | |

(Continued)

OTHER PUBLICATIONS

Kim, KR20180016158 A, English machine translation (Year: 2018).*

(Continued)

*Primary Examiner* — Patrick Orme
(74) *Attorney, Agent, or Firm* — KED & ASSOCIATES, LLP

(57) ABSTRACT

A filter module for a water dispensing device according to the present disclosure includes a filter housing which has an inflow port and a discharge port, and a plurality of filters which includes a filtration member provided in the filter housing to purify water flowing therein through the inflow port and to supply purified water to the discharge port, and filtering raw water flowing therein from the outside into purified water, and the filter module includes a pre-filter through which raw water passes firstly and in which a first carbon block having a hollow shape is built-in, a hollow fiber membrane (UF membrane) filter through which water passes through the pre-filter passes secondly, a second carbon block having a hollow shape through which water passing through the hollow fiber membrane filter passes thirdly, and an electrostatic adsorption member through which water passing through the second carbon block passes fourthly.

16 Claims, 6 Drawing Sheets

(51) Int. Cl.
  *B01D 35/06* (2006.01)
  *B01D 35/30* (2006.01)
  *B01D 39/14* (2006.01)
  *B01D 61/14* (2006.01)
  *B01D 61/16* (2006.01)
  *B01D 61/18* (2006.01)
  *C02F 1/00* (2023.01)
  *C02F 1/28* (2023.01)
  *C02F 1/48* (2023.01)
  *C02F 1/44* (2023.01)

(52) U.S. Cl.
  CPC ........... *B01D 39/14* (2013.01); *B01D 61/145* (2013.01); *B01D 61/16* (2013.01); *B01D 61/18* (2013.01); *B01D 2201/12* (2013.01); *B01D 2201/304* (2013.01); *B01D 2239/0435* (2013.01); *B01D 2239/065* (2013.01); *B01D 2311/2603* (2013.01); *B01D 2311/2626* (2013.01); *B01D 2311/2649* (2013.01); *C02F 1/003* (2013.01); *C02F 1/283* (2013.01); *C02F 1/444* (2013.01); *C02F 1/48* (2013.01); *C02F 2307/10* (2013.01)

(58) Field of Classification Search
  CPC .... B01D 29/213; B01D 35/06; B01D 35/301; B01D 39/14; B01D 61/145; B01D 61/16; B01D 61/18; B01D 63/024; B01D 2201/12; B01D 2201/304; B01D 2239/0435; B01D 2239/065; B01D 2311/2603; B01D 2311/2626; B01D 2311/2649
  See application file for complete search history.

(56) References Cited

FOREIGN PATENT DOCUMENTS

| CN | 102510836 | | 6/2012 |
| CN | 104602783 | | 5/2015 |
| CN | 106457158 | | 2/2017 |
| CN | 109982974 | | 7/2019 |
| JP | 2003-047957 | | 2/2003 |
| JP | 2003-126846 | | 5/2003 |
| KR | 10-2014-0047997 | | 4/2014 |
| KR | 20160053897 A | * | 5/2016 |
| KR | 10-2016-0075044 | | 6/2016 |
| KR | 20170121400 A | * | 11/2017 |
| KR | 10-2018-0016158 | | 2/2018 |
| KR | 10-2018-0017797 | | 2/2018 |
| WO | WO 2019/146910 | | 8/2019 |

OTHER PUBLICATIONS

Won, KR20170121400 A, English machine translation (Year: 2017).*
Choi, KR20160053897 A, English machine translation (Year: 2016).*
Hur, KR20160075044 A, English machine translation (Year: 2016).*
Indian Office Action dated Dec. 30, 2022 issued in Application No. 202114060305.
Korean Office Action dated Aug. 31, 2022 issued in KR Application No. 10-2021-0002034.
Chinese Office Action dated Apr. 4, 2023 issued in Application No. 202210009268.6.
Chinese Office Action dated Aug. 31, 2023 issued in Application No. 202210009268.6.

* cited by examiner

FILTER MODULE FOR WATER DISPENSING DEVICE

CROSS-REFERENCE TO RELATED APPLICATION

The present application claims priority under 35 U.S.C. 119 and 35 U.S.C. 365 to Korean Patent Application No. 10-2021-0002034, filed in Korea on Jan. 7, 2021, which is hereby incorporated by reference in its entirety.

BACKGROUND

1. Field

The present specification relates to a filter module for a water dispensing device having an electrostatic adsorption function.

2. Background

In general, water dispensing devices such as water purifiers and refrigerators refer to devices for purifying raw water such as tap water or groundwater. In other words, the water dispensing device refers to a device for converting raw water into drinking water through various purification methods and providing the drinking water. In order to generate purified water, processes such as precipitation, filtration, and sterilization may be performed, and harmful substances are generally removed through these processes, or the like.

In general, various filters may be provided in a water dispensing device to purify raw water. These filters may be classified into a sediment filter, an activated carbon filter, an ultrafiltration (UF) hollow fiber membrane filter, a reverse osmosis (RO) membrane filter, and the like according to their functions. The sediment filter may refer to as a filter for precipitating contaminants or suspended matter having large particles in raw water, and the activated carbon filter may refer to as a filter for adsorbing and removing contaminants with small particles, residual chlorine, volatile organic compounds, or odor generation factors.

In addition, two activated carbon filters may generally be provided. In other words, two activated carbon filters may include a pre-activated carbon filter provided on the raw water side and a post-activated carbon filter provided on the purified water side. The post activated carbon filter may be provided to improve the taste of water by removing odor-causing substances that mainly affect the taste of purified water. In addition, the UF hollow fiber membrane filter and the RO membrane filter are generally used selectively.

Recently, the demand for a water purifier or a refrigerator having a water purifying function has increased significantly. Therefore, there is a problem that various requirements are generated and it is difficult to satisfy the various requirements at the same time.

As an example, it is possible to remove heavy metals by applying the RO membrane filter, but there is a problem in that it is difficult to secure the purified water flow rate. In other words, there is a problem in that it takes a lot of time to obtain a desired amount of purified water. On the other hand, in the case of the UF hollow fiber membrane filter, it is possible to secure a high flow rate, but since it is difficult to remove heavy metals in water, there is a problem in that it is difficult to use groundwater or tap water from a contaminated area as raw water.

Therefore, removal of heavy metals and securing high flow rates were inevitably recognized as contradictory problems. This is because, when using an RO membrane filter to remove heavy metals, it is difficult to secure high flow rate, and when using a UF hollow fiber membrane filter to secure high flow rate, it becomes difficult to remove heavy metals.

In addition, in the conventional case, when a carbon block is used as a single filter, it is difficult to remove viruses and bacteria, and when several filters are individually provided, there was a problem in that the volume of the filter increases. In addition, since the UF filter (ultrafiltration filter) or the electrostatic adsorption filter is a chemical product, when the UF filter or the electrostatic adsorption filter is applied last, an issue occurs in that the taste of water changes.

In addition, virus removal performance may be affected by the quality of the raw water. In the case of overseas areas, the quality of raw water is often worse than that of domestic water. Therefore, if the filter does not properly remove the virus in the water, there is also a problem that the filter performance is reduced.

BRIEF DESCRIPTION OF THE DRAWINGS

Embodiments will be described in detail with reference to the following drawings in which like reference numerals refer to like elements, and wherein.

DETAILED DESCRIPTION

Figure 1:
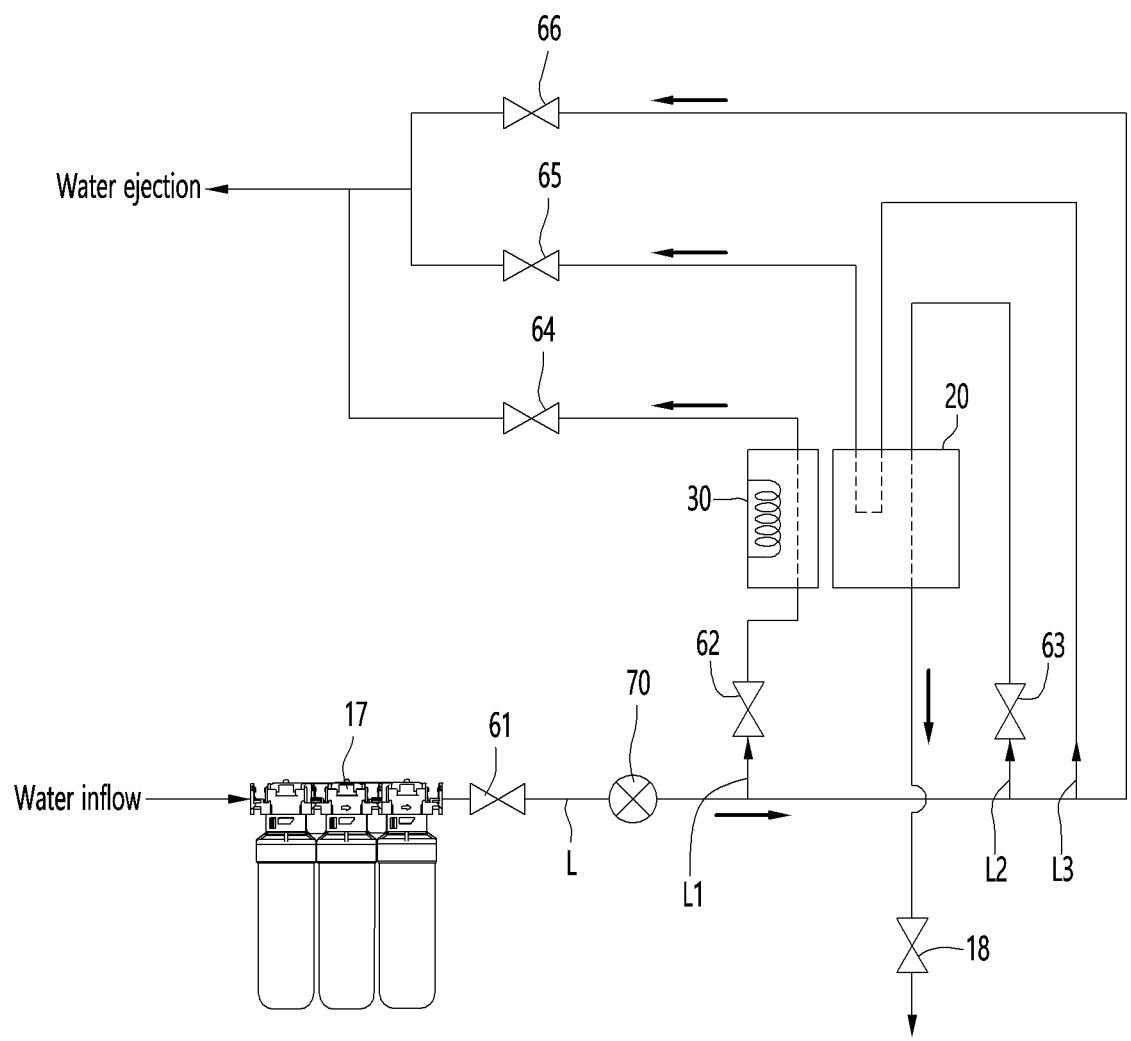
FIG. 1 is a water pipe diagram illustrating a water dispensing device to which a filter module according to the present disclosure is applied.

Hereinafter, specific embodiments of the present disclosure will be described in detail with reference to the drawings. However, the idea of the present disclosure is not limited to the embodiments presented below, and those skilled in the art who understand the idea of the present disclosure will be able to easily implement other embodiments included within the scope of the same idea by adding, changing, deleting, and adding components, but this will also be said to be included within the scope of the present disclosure.

The drawings accompanying the following embodiments are embodiments of the same inventive idea, but within the scope that the inventive idea is not damaged, in order to be easily understood, the expression of minute parts may be expressed differently for each drawing, and, according to the drawing, a specific part may not be displayed or may be exaggerated according to the drawing.

FIG. 1 is a water pipe diagram illustrating a water dispensing device to which a filter module according to the present disclosure is applied. The water dispensing device according to the present disclosure is for directly taking out purified water after purifying water supplied from an external water supply source, cooling the water or heating the water to take the water out, and may refer to, for example, a direct water type purifier. Here, the direct water type purifier refers to a type of water purifier in which water passes through a filter in real time and purified water is ejected when a user requests for ejection of purified water without a storage tank in which purified water is stored.

In addition, the water dispensing device according to the present disclosure may refer to a refrigerator having a water purification function. In other words, while being a refrigerator, the water dispensing device may refer to a water purifier refrigerator including a filter for purifying raw water and a water ejection nozzle through which purified water is ejected. In addition, the water dispensing device according to the present disclosure may refer to an undersink type water purifier in which the main body is installed under the sink and the water ejection nozzle is installed outside the sink. In addition, the water dispensing device according to the present disclosure may refer to various types of known devices that receive water from a water supply source, pass the water through a filter to perform water purification treatment, and then supply the purified water to the outside.

Referring to FIG. 1, in the water dispensing device according to an embodiment of the present disclosure, a water supply line L is formed from a water supply source to a water ejection port, and various valves and parts can be connected to the water supply line L. More specifically, the water supply line L is connected to the water supply source, for example, a domestic faucet, or the like, and a filter module 17 is disposed at a certain point of the water supply line L and thus foreign substances contained in drinking water which is supplied from the water supply source are filtered.

In addition, the water supply valve 61 and the flow rate sensor 70 may be sequentially disposed in the water supply line L connected to the discharge port end of the filter module 17. Accordingly, when the supply amount sensed by the flow rate sensor 70 reaches a set flow rate, the water supply valve 61 may be controlled to be closed. In addition, at any point of the water supply line L extending from the discharge port end of the flow sensor 70, a water supply line for hot water supply L1, a water supply line for cold water supply L3, and a water supply line for cooling water supply L2 may be branched.

In addition, a purified water ejection valve 66 may be mounted at the end portion of the water supply line L extending from the discharge port end of the flow sensor 70, and a hot water ejection valve 64 may be mounted at the end portion of the water supply line for hot water supply L1. In addition, a cold water ejection valve 65 may be mounted at an end portion of the water supply line for cold water supply L3, and a cooling water valve 63 may be mounted at any point of the water supply line for cooling water supply L2. The cooling water valve 63 may adjust the amount of cooling water supplied to the cooling water generation part 20.

In addition, the water supply line extending from the discharge port ends of the hot water ejection valve 64, the cold water ejection valve 65, and the purified water ejection valve 66 are all connected to the water ejection port. In addition, as illustrated, the purified water, cold water, and hot water may be configured to be connected to a single take-out port or may be configured to be respectively connected to independent take-out ports in some cases.

Hereinafter, a supply process of water purification will be described with reference to FIG. 1. In the case of purified water, when the purified water ejection valve 66 is opened by pressing the purified water selection button on the manipulation display part, purified water that has passed through the filter module 17 may be taken out through the water ejection port.

Hereinafter, a cold water and hot water supply process will be described with reference to FIG. 1. First, in the case of cold water, when the cooling water valve 63 is opened and cooling water is supplied to the cold water generation part 20, while the water in the water supply line for cold water supply L3 passing through the cold water generation part 20 is cooled by the cooling water, cold water is produced.

In this case, the water supply line for cooling water supply L2 may include a refrigerant cycle for cooling the cooling water. The refrigerant cycle may include a compressor, a condenser, an expansion valve, an evaporator, and the like. Thereafter, when the cold water ejection valve 65 is opened by pressing the cold water selection button of the manipulation display part, cold water may be taken out through the water ejection port.

Meanwhile, in the case of hot water, hot water is generated while the water flowing along the water supply line for hot water supply L1 is heated by the hot water heater 30, and when the hot water ejection valve 64 is opened by pressing the hot water selection button of the manipulation display part, hot water may be taken out through the water ejection port.

The filter module 17 of the water dispensing device according to an embodiment of the present disclosure having the above configuration includes at least one filter to generate purified water from raw water. Hereinafter, a filter module for a water dispensing device according to an embodiment of the present disclosure will be described.

Figure 2:
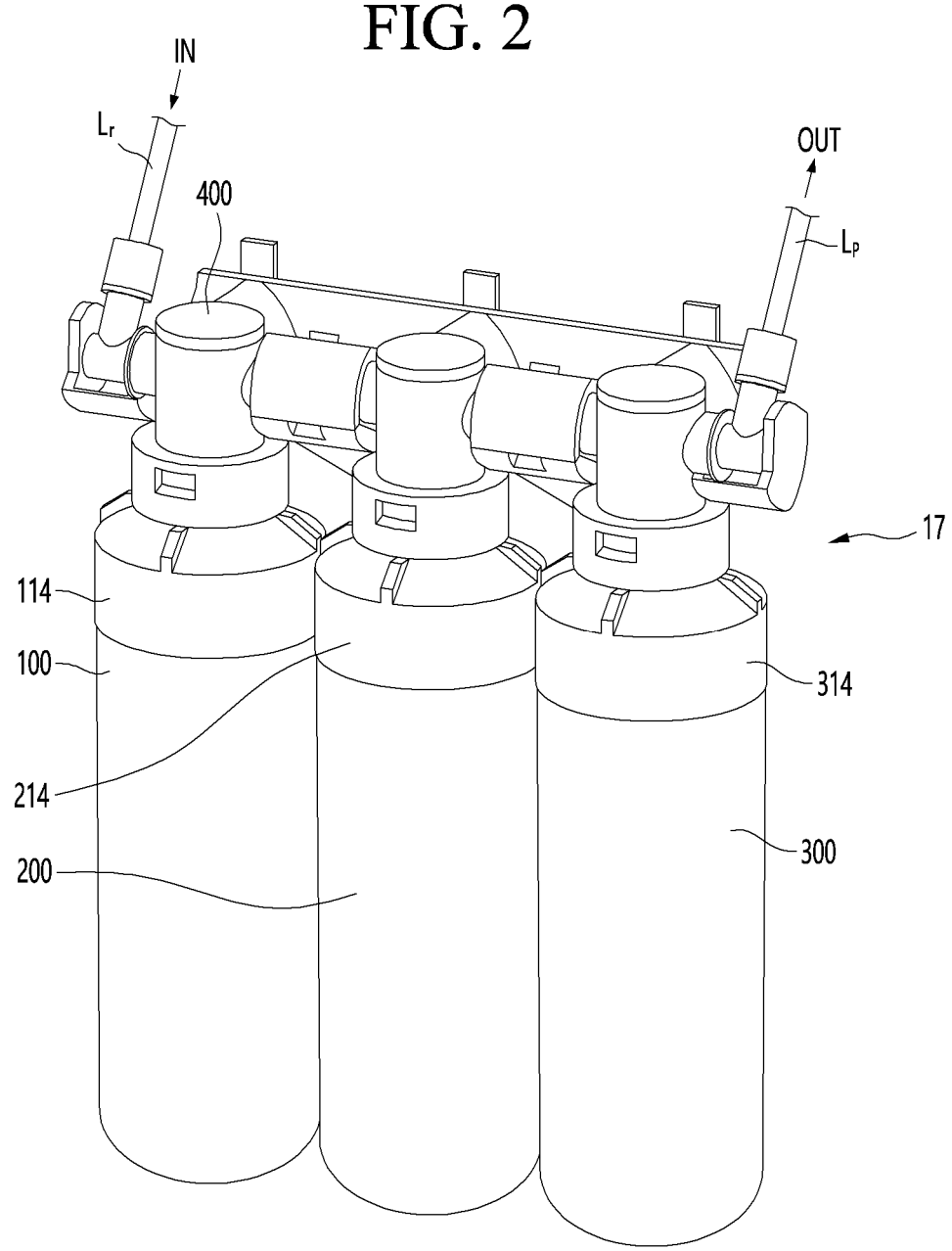
FIG. 2 is a perspective view illustrating a filter module for a water dispensing device according to an embodiment of the present disclosure.
Figure 3:
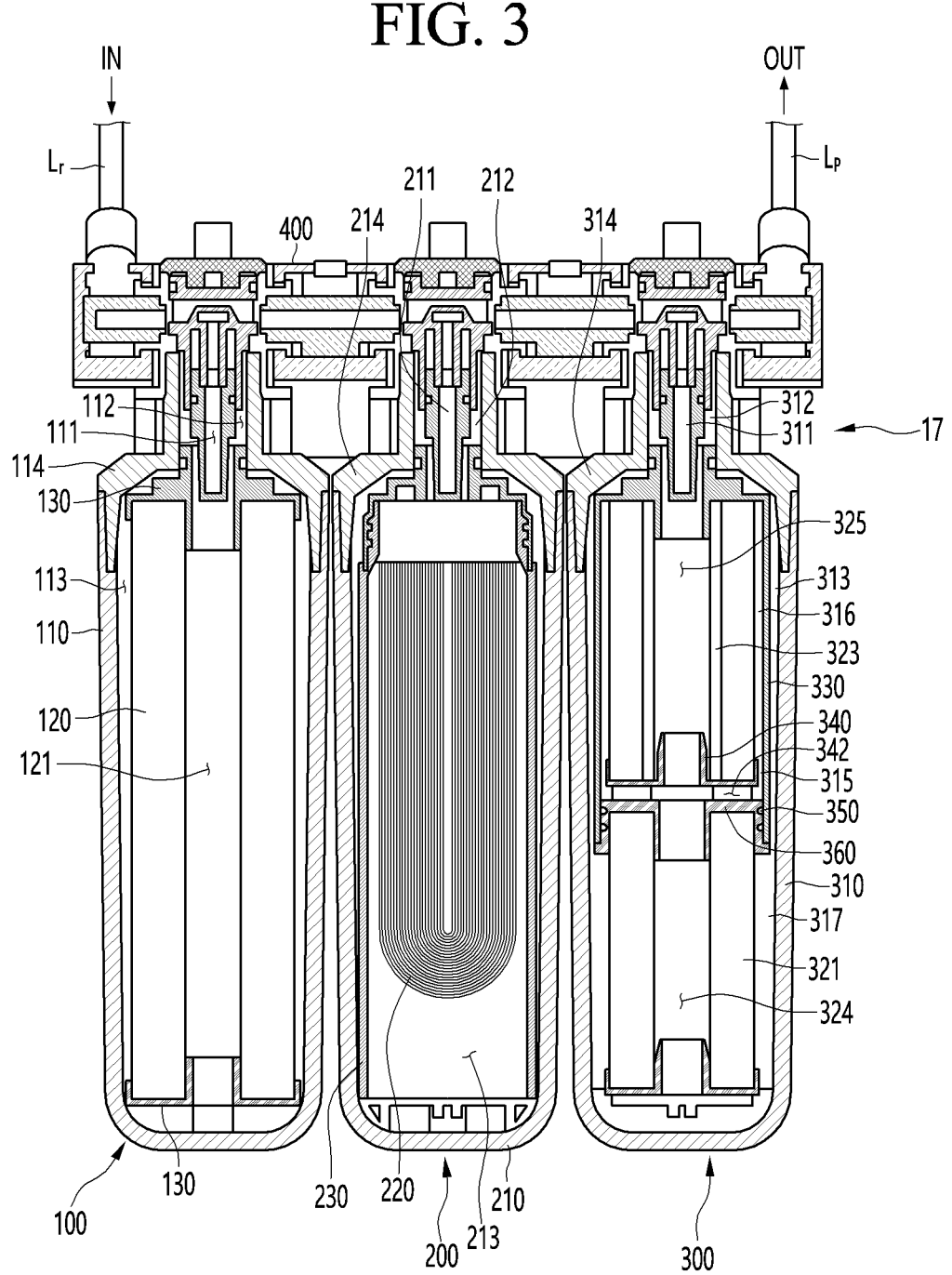
FIG. 3 is a cross-sectional view illustrating a filter module for a water dispensing device according to an embodiment of the present disclosure.
Figure 4:
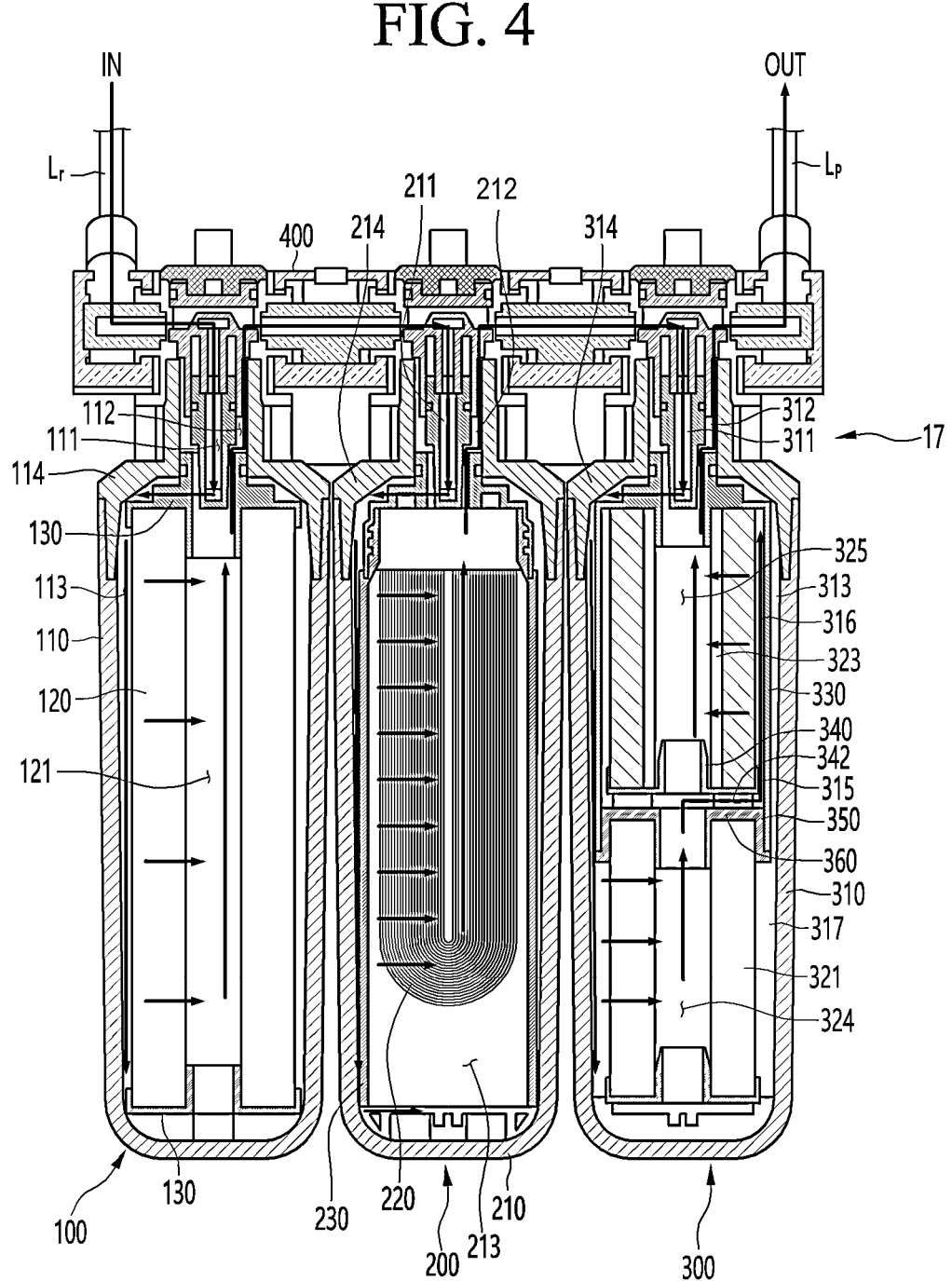
FIG. 4 is a view in which the flow direction of water is indicated by arrows in FIG. 3.

FIG. 2 is a perspective view illustrating a filter module for a water dispensing device according to an embodiment of the present disclosure, FIG. 3 is a cross-sectional view illustrating a filter module for a water dispensing device according to an embodiment of the present disclosure, and FIG. 4 is a view in which the flow direction of water is indicated by arrows in FIG. 3. Referring to FIGS. 2 to 4, the filter module for a water dispensing device according to an embodiment of the present disclosure includes a plurality of filters.

The filter module 17 for the water dispensing device is detachably coupled to the filter socket 400 installed on the water supply flow path L. The filter socket 400 may form a plurality of filter connection parts so that a plurality of filters 100, 200, and 300 are mounted.

For example, the filter socket 400 may form three filter connection parts so that a total of three filters 100, 200, and 300 are mounted. In addition, the filters 100, 200, and 300 may be fixed to the filter socket 400 by inserting the filters into the filter socket 400 and turning the filters to one side. In addition, the filters 100, 200, and 300 may be separated from the filter socket 400 by turning the filters to the other side opposite to the one side and pulling the filters out in a state of being fixed to the filter socket 400.

The filter socket 400 may have one side (the left side of FIG. 3) connected to the raw water flow path Lr in which raw water flows, and the other side (the right side of FIG. 3) connected with the purified water flow path Lp through which the purified water is discharged. The raw water flow path Lr may be connected to a water supply source, and the water supply line for hot water supply L1 and the water supply line for cold water supply L3 may branch from the purified water flow path Lp.

Referring to FIGS. 2 to 4, the filter module 17 for the water dispensing device may include a pre-filter 100. In addition, the filter module 17 for the water dispensing device may include a hollow fiber membrane filter 200. In addition, the filter module 17 for the water dispensing device includes a composite filter 300. In addition, the filter module 17 for the water dispensing device may include a plurality of filters selected from the pre-filter 100, the hollow fiber membrane filter 200, or the composite filter 300.

For example, the filter module 17 for the water dispensing device may include all of the pre-filter 100, the hollow fiber membrane filter 200, and the composite filter 300. In addition, the pre-filter 100, the hollow fiber membrane filter 200, and the composite filter 300 may be sequentially disposed along the flow direction of water.

Each of the filters 100, 200, and 300 may include a filter housing 110, 210, 310 having an inflow port and a discharge port, and a filtration member provided in the filter housing 110, 210, 310 to purify the water flowing therein through the inflow port. Inflow ports 111, 211, 311 in which water flows are formed in the upper center of the filter housings 110, 210, and 310, and discharge ports 112, 212, and 312 through which the water passing through the filtration member exits may be formed on the outside of the inflow ports 111, 211, and 311.

In addition, the water flowing into the inflow ports 111, 211, 311 flows from the upper side to the lower side along the inflow path defined by the inner surface of the filter housing 110, 210, 310 and then passes through the filtration member, and the water passing through the filtration member flows from the lower side to the upper side along the discharge flow path located on the central side of the inflow path, and then exits to the outside of the filter housings 110, 210, 310 through the discharge ports 112, 212, and 312.

The pre-filter 100 has an inflow port 111 and a discharge port 112 formed therein and may include a first filter housing 110 having a space 113 therein and a filtration member accommodated in the first filter housing 110. The filtration member of the pre-filter 100 may be provided as a first carbon block 120 having a hollow shape. Accordingly, the raw water flowing into the filter module 17 may be filtered firstly while passing through the first carbon block 120.

Referring to FIG. 4, the raw water flowing into the pre-filter 100 through the inflow port 111 flows therein from the upper side to the lower side through a space between the first filter housing 110 and the outer surface of the first carbon block 120 and then is filtered while passing through the first carbon block 120. In addition, the water passing through the first carbon block 120 flows from the lower side to the upper side through the hollow 121 of the first carbon block 120 and, through the discharge port 112 communicating with the hollow 121, is discharged to the outside of the pre-filter 100.

Then, the water flowing out of the pre-filter 100 flows to the hollow fiber membrane filter 200. The filtration member of the hollow fiber membrane filter 200 may be provided with a plurality of hollow fiber membranes 220 (UF Membrane). Accordingly, the water flowing into the hollow fiber membrane filter 200 may be filtered secondly while passing through the hollow fiber membrane 220.

Referring to FIG. 4, the hollow inner member 230 is disposed in the space 213 inside the second filter housing 210, and the hollow fiber membrane 220 is disposed inside the inner member 230. Then, the water flowing into the hollow fiber membrane filter 200 through the inflow port 211 flows from the upper side to the lower side along the flow path defined by a space between the second filter housing 210 and the hollow inner member 230. Thereafter, the water flows into the inner member 230 through a space between the lower end of the inner member 230 and the second filter housing 210.

A hollow fiber membrane 220 is disposed inside the inner member 230, and the water flowing into the inner member 230 is secondly filtered while passing through the hollow fiber membrane 220, and then discharged to the outside of the second filter housing 210 through the discharge port 212. Then, the water that exits through the hollow fiber membrane filter 200 flows to the composite filter 300.

The composite filter 300 may include a second carbon block 321 having a hollow shape through which water passing through the hollow fiber membrane filter 200 passes thirdly, and an electrostatic adsorption member through which water passing through the second carbon block 321 passes fourthly. The electrostatic adsorption member may mean, for example, the electrostatic adsorption nonwoven fabric 322. In the following description, the electrostatic adsorption member will be described as the electrostatic adsorption nonwoven fabric 322, but the scope of the present invention is not limited thereto, and the electrostatic adsorption member may be made of various materials having an electrostatic adsorption function in addition to the electrostatic adsorption nonwoven fabric 322.

In this case, the filtration member of the composite filter 300 may include a second carbon block 321 and an electrostatic adsorption nonwoven fabric (or electrostatic adsorption filter) 322. In addition, the filtration member of the composite filter 300 may further include a third carbon block 323 having a hollow shape through which the water passing through the electrostatic adsorption nonwoven fabric 322 passes fifthly. Accordingly, the water introduced into the composite filter 300 may be filtered thirdly while passing through the second carbon block 321, filtered fourthly while passing through the electrostatic adsorption nonwoven fabric 322, filtered fifthly while passing through the third carbon block 323, and then finally discharged to the outside of the composite filter 300.

Referring to FIG. 4, a second carbon block 321, an electrostatic adsorption nonwoven fabric 322, and a third carbon block 323 are disposed in the space inside the third filter housing 310. At this time, the space inside the third filter housing 310 is divided into an upper space and a lower space, the second carbon block 321 is disposed in the lower space, and the electrostatic adsorption nonwoven fabric 322 and the third carbon block 323 may be disposed in the upper space.

In addition, a hollow inner cover 330 is disposed on the upper side in the space of the inner side of the third filter housing 310, and the electrostatic adsorption nonwoven fabric 322 and a third carbon block 323 may be disposed in the inner cover 330. In addition, the water flowing into the composite filter 300 through the inflow port 311 flows from the upper side to the lower side along the first flow path 313 defined a space by between the third filter housing 310 and the hollow inner cover 330.

Thereafter, the water flows into the lower space of the third filter housing 310 through the lower end of the inner cover 330 and flows from the upper part to the lower part along the second flow path 317 defined by a space between the third filter housing 310 and the second carbon block 321. Then, while passing through the second carbon block 321 disposed in the lower space of the third filter housing 310, after being filtered, the water flows from the lower side to the upper side through the hollow 324 of the second carbon block 321.

Then, after flowing into the inner cover 330, the water is filtered while passing through the electrostatic adsorption nonwoven fabric 322 and the third carbon block 323 and flows from the lower side to the upper side through the hollow 325 of the third carbon block 323. Thereafter, the water exits the third filter housing 310 through the discharge port 312 communicating with the hollow 325 of the third carbon block 323.

Figure 5:
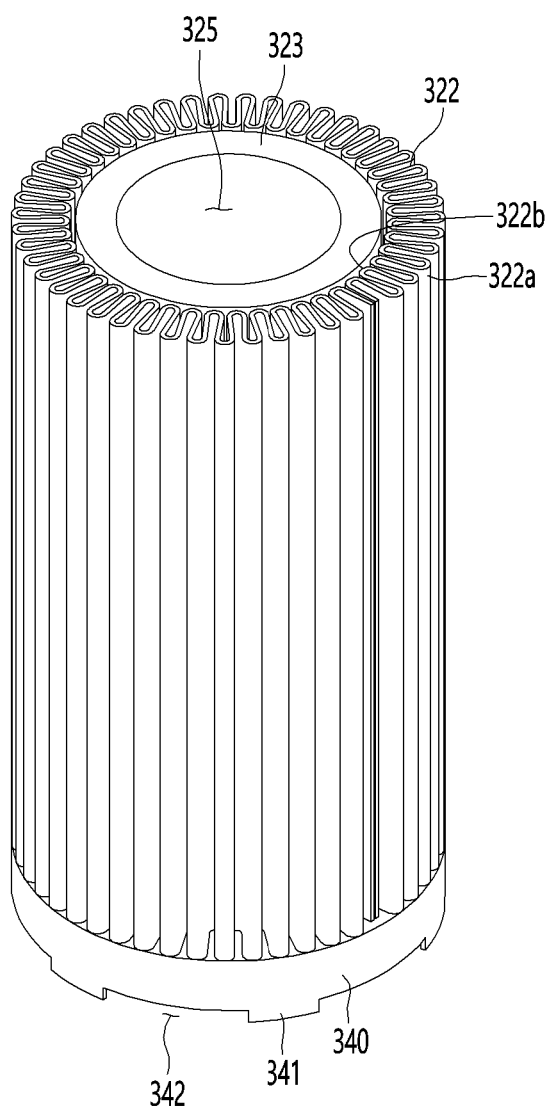
FIG. 5 is a perspective view illustrating a state where a third carbon block and an electrostatic adsorption nonwoven fabric, which are some components of the present invention, are coupled.

FIG. 5 is a perspective view illustrating a state where a third carbon block and an electrostatic adsorption nonwoven fabric, which are some components of the present invention, are coupled. Referring to FIGS. 3 to 5, the electrostatic adsorption nonwoven fabric 322 may form a hollow part. The electrostatic adsorption nonwoven fabric 322 may have a hollow pipe shape as a whole. In addition, the electrostatic adsorption nonwoven fabric 322 may include powdered activated carbon particles.

In addition, the electrostatic adsorption nonwoven fabric 322 may form a closed curve by crimping a rectangular nonwoven fabric and thermally fuse in a state where both end portions of the nonwoven fabric are in contact. The electrostatic adsorption nonwoven fabric 322 includes a plurality of convex parts (or convex surfaces) 322a formed to be convex outward and concave parts (or concave surfaces) 322b provided between the convex parts 322a, so that wrinkles can be formed along the circumferential direction.

In the present disclosure, a case where wrinkles are formed in the electrostatic adsorption nonwoven fabric 322 will be described as an example, but the scope of the present disclosure is not limited thereto, and the electrostatic adsorption nonwoven fabric 322 may not be wrinkled. In addition, the electrostatic adsorption nonwoven fabric 322 may be formed in a rolling type like a rolled toilet paper. In addition, the electrostatic adsorption nonwoven fabric 322 may be formed as a single layer. In addition, the electrostatic adsorption nonwoven fabric 322 may be formed in multiple layers.

As described above, when the electrostatic adsorption nonwoven fabric 322 is formed to be wrinkled, the surface area of the electrostatic adsorption nonwoven fabric 322 increases, and heavy metals in water can be more reliably removed. In addition, when the electrostatic adsorption nonwoven fabric 322 is formed in multiple layers, heavy metals in water can be more reliably removed.

The electrostatic adsorption nonwoven fabric 322 may be disposed to surround the outer surface of the third carbon block 325. In addition, the water passing through the second carbon block 321 may flow into the inner side of the inner cover 330 through the communication hole 342 communicating with the hollow 324 of the second carbon block 321.

A first filter bracket 360 is coupled to the upper end of the second carbon block 321, the first filter bracket 360 is inserted into the lower end of the inner cover 330, and a sealing member (or seal) 350 may be inserted between the first filter bracket 360 and the inner cover 330. A second filter bracket 340 is coupled to the lower end of the electrostatic adsorption nonwoven fabric 322 and the third carbon block 323, and the second filter bracket 340 may be seated on the upper end of the first filter bracket 360.

The communication hole 342 may be defined by a clearance between the lower ends of the electrostatic adsorption nonwoven fabric 322 and the third carbon block 323 and the upper end of the second carbon block 321. The communication hole 342 may be defined by the clearance between a second filter bracket 340 fixed to the lower end of the electrostatic adsorption nonwoven fabric 322 and the third carbon block 323 and a first filter bracket 360 fixed to the upper end of the second carbon block 321. For example, a plurality of leg parts (or legs) 341 extending along the circumference and protruding downward are formed at the lower end of the second filter bracket 340, a groove having a relatively upwardly concave shape is formed between the leg parts 341, and the communication hole 342 may be defined by the groove.

The outer diameter of the second filter bracket 340 is formed to be smaller than the inner diameter of the inner cover 330, and a third flow path 315 may be provided therebetween. Accordingly, the water in the hollow 324 of the second carbon block 321 flows between the first filter bracket 360 and the second filter bracket 340 through the hollow of the first filter bracket 360, and then, through the communication hole 342, the water flows into the inner cover 330. Then, the water passing through the communication hole 342 flows into the third flow path 315 provided between the second filter bracket 340 and the inner cover 330, and flows through a fourth flow path 316 provided between the outer surface of the electrostatic adsorption nonwoven fabric 322 and the inner cover 330. Then, the water passes through the electrostatic adsorption nonwoven fabric 322 and the third carbon block 323 in order.

In the present embodiment, the second carbon block 321, the electrostatic adsorption nonwoven fabric 322, and the third carbon block 323 may be accommodated in one filter housing 310 to constitute the composite filter 300. Then, while flowing from the lower side to the upper side, the water flowing into the filter housing 310 passes through the second carbon block 321, the electrostatic adsorption nonwoven fabric 322, and the third carbon block 323 in order.

As described above, when the water flowing into the filter housing 310 passes through the electrostatic adsorption nonwoven fabric 322, the virus in the water may be removed. In addition, when the water flowing into the filter housing 310 passes through the electrostatic adsorption nonwoven fabric 322, heavy metals such as chromium (Cr) and selenium (Se) in the water may be removed. For example, in the present disclosure, the electrostatic adsorption nonwoven fabric 322 may be implemented by applying a polyamine-based polymer positively charged functional group to a cellulose support body.

For reference, the virus is negatively charged in tap water state (neutral pH), and when passing through a filter including the electrostatic adsorption nonwoven fabric 322, the virus is removed while being electrostatically adsorbed by a positively charged functional group. Accordingly, when the water flowing into the filter housing 310 passes through the electrostatic adsorption nonwoven fabric 322, the virus and fine particles in the water may be adsorbed and removed through positive charge adsorption.

The electrostatic adsorption nonwoven fabric 322 may also be referred to as a 'positive charge adsorption nonwoven fabric' from a functional point of view. Here, the electrostatic adsorption nonwoven fabric 322 is a material different from the 'anion nonwoven fabric'.

Figure 6:
FIG. 6 is a table illustrating the components to be removed by each material constituting the present disclosure.

FIG. 6 is a table illustrating the components to be removed by each material constituting the present disclosure. Referring to FIG. 6, when water passes through a plurality of carbon blocks, it can be confirmed that residual chlorine, chloroform, particulate matter, and heavy metals in the water are removed, and taste, odor, and the like are reduced.

In addition, when water passes through the hollow fiber membrane, it can be confirmed that particulate matter and bacteria in the water are removed. In addition, when water passes through the electrostatic adsorption nonwoven fabric, it can be confirmed that particulate matter, bacteria, and viruses are removed.

Therefore, as in the present disclosure, when the water flowing into the filter module 17 passes through the plurality of carbon blocks 120, 321, and 323, the hollow fiber membrane, and the electrostatic adsorption nonwoven fabric, residual chlorine, chloroform, particulate matter, heavy metals, bacteria, and viruses in water can be removed. In addition, since the water flowing into the composite filter 300 finally passes through the third carbon block 323, the smell of water is removed and the taste of water is improved.

Meanwhile, as described above, when the second carbon block 321, the electrostatic adsorption nonwoven fabric 322, and the third carbon block 323 are disposed in a line in one filter housing 310, the filtration efficiency can increase and the purified water flow rate can be maintained. In addition, there is no need to expand the filter installation space formed in the water purifier, refrigerator, or the like and it can be applied immediately by simply replacing the existing filter. In addition, space utilization can increase by reducing the volume of the filter, and furthermore, slimming of a water purifier, a refrigerator, and the like can be realized.

At least one of the carbon blocks 120, 321, and 323 may be formed by processing a mixture containing activated carbon and a binder. The activated carbon may be included in the form of granular or powder. As described above, when the carbon blocks 120, 321, and 323 include activated carbon, the carbon blocks 120, 321, and 323 can effectively remove heavy metals in water and also residual chlorine components in water. Accordingly, the taste of water may also be improved. In addition, chloroform ($CHCL_3$) in water can be also effectively removed by the activated carbon.

In addition, the carbon blocks 120, 321, and 323 include a binder. The binder connects the activated carbon and the selectively mixed functional material to each other and is mixed to impart rigidity. With the configuration of the binder, the activated carbon and the functional material may be processed in the form of a block having rigidity.

For example, the functional material may include titanium oxide (for example, $Na_4TiO_4$) and Ferric Hydroxide. In other words, the carbon blocks 120, 321, and 323 may be prepared by mixing activated carbon and a binder and may be prepared by further including titanium oxide (for example, $Na_4TiO_4$) and Ferric Hydroxide.

For reference, the carbon blocks 120, 321, and 323 may be formed by uniformly mixing a plurality of materials, including activated carbon and a binder, and then putting it in a mold and heating it. A binder (for example, polyethylene, PE) is melted by heating in the mold, and materials such as activated carbon are coupled. Accordingly, the carbon blocks 120, 321, and 323 in the form of blocks having overall rigidity can be formed.

Hereinafter, additional configurations of each filter will be described. The pre-filter 100 may further include a filter bracket 130 accommodated inside the filter housing 110 and coupled to the upper side and/or lower side of the first carbon block 120. In addition, each of the filter housings 110, 210, 310 has an open upper side, and the open upper side is blocked by a separate cap 114, 214, 314, and according to whether the caps 114, 214, 314 are separated, the filter housing can be selectively opened.

Hereinafter, the manufacturing process of the carbon blocks 120, 321, and 323, which are some components of the present disclosure, will be briefly described. First, each material constituting the carbon blocks 120, 321, and 323 is mixed in a proportion to create a carbon block mixture.

Then, the evenly mixed carbon block mixture is filled in the mold. Then, the evenly mixed carbon block mixture goes through a compression process and is put into an electric furnace. Then, a heating process is performed. In the heating process, the binder, for example, polyethylene (PE) is melted, the activated carbon and the binder are integrally coupled, and the carbon blocks 120, 321, and 323 in the form of a hollow tube having overall rigidity may be molded.

In addition, after heating, cooling proceeds, and when cooling is completed, the mold is separated. In addition, the hollow tube-shaped carbon block separated from the mold may be cut to a unit length. For example, the first carbon block 120 may be cut to have a longer length than the second carbon block 321 and the third carbon block 323. In addition, the cut carbon blocks 120, 321, and 323 may be cleaned by spraying compressed air. After that, the dimensions and the weight are checked, and if there are no abnormalities, packaging is performed.

According to the present disclosure as described above, there is an effect that the water flowing into the filter housing passes through the electrostatic adsorption filter and then flows out to the outside of the filter housing, so that viruses, bacteria, particulate matter, or the like can be reliably removed, and the filtration power can be improved. According to the present disclosure, there is an effect that a flow path can be secured so that water flowing into the filter housing passes through the electrostatic adsorption filter and the carbon block in turn, and then exits to the outside of the filter housing. According to the present disclosure, there is also an effect that the specific surface area of the electrostatic adsorption nonwoven fabric increases, and thus the filter life can be prolonged.

According to the present disclosure, there is an effect of more reliably removing particulate matter, bacteria, and viruses contained in water. According to the present disclosure, there is an effect of preventing the taste of water finally supplied to the user from being changed. According to the present disclosure, there is an effect that the water purification process is performed several times by a plurality of filters, and thus the removal of various foreign substances including heavy metals can be performed more reliably.

According to the present disclosure, since only the material of the filter is changed and the shape or disposition structure of a filter applied to a water purifier, a refrigerator, or the like is not changed, there is an effect that the present disclosure can be directly applied to an existing refrigerator, a water purifier, or the like. According to the present disclosure, there is an effect that space utilization can be increased by deposing heterogeneous filters in one filter housing in the longitudinal direction to reduce the volume of the filter, and furthermore, the slimming of refrigerators and water purifiers can be realized.

In order to provide the above-identified aspects, the present disclosure provides a filter module for a water dispensing device which can reliably remove viruses, bacteria, particulate matter, or the like by allowing the water flowing into the filter housing to pass through the electrostatic adsorption filter and then to exit to the outside of the filter housing. The present disclosure provides a filter module for a water dispensing device that secures a flow path so that water flowing into a filter housing passes through an electrostatic adsorption filter and a carbon block in turn, and then exits to the outside of the filter housing.

The present disclosure provides a filter module for a water dispensing device capable of more reliably removing particulate matter, bacteria, and viruses contained in water. The present disclosure provides a filter module for a water dispensing device that prevents the taste of water finally supplied to a user from being changed.

The present disclosure provides a filter module for a water dispensing device that can be directly applied to an existing water purifier, refrigerator, or the like without changing the shape or disposition structure of the filter applied to the water purifier, refrigerator, or the like. The present disclosure provides a filter module for a water dispensing device that can increase space utilization by disposing heterogeneous filters in one filter housing in the longitudinal direction to reduce the volume of the filter.

A filter module for a water dispensing device according to the present disclosure includes a filter housing which has an inflow port and a discharge port, and a filtration member provided in the filter housing to purify water flowing therein through the inflow port and to supply purified water to the discharge port. In addition, a filter module may include a pre-filter through which raw water passes firstly and in which a first carbon block having a hollow shape is built-in, a hollow fiber membrane (UF membrane) filter through which water passes through the pre-filter passes secondly, a second carbon block having a hollow shape through which water passing through the hollow fiber membrane filter passes thirdly, and an electrostatic adsorption nonwoven fabric through which water passing through the second carbon block passes fourthly.

The filter module may further include a third carbon block having a hollow shape through which water passing through the electrostatic adsorption member passes fifthly. The electrostatic adsorption member may be disposed to surround an outer surface of the third carbon block.

The second carbon block, the electrostatic adsorption nonwoven fabric, and the third carbon block may be disposed inside one third filter housing to constitute a composite filter. The second carbon block may be disposed in a lower space of the third filter housing, and the electrostatic adsorption nonwoven fabric and the third carbon block may be disposed in an upper space of the third filter housing. The composite filter may have an inner cover in an upper space of the filter housing, and the electrostatic adsorption member and the third carbon block may be accommodated in the inner cover.

The water flowing into the third filter housing may flow from the upper side to the lower side along a first flow path provided between the inner surface of the third filter housing and the outer surface of the inner cover and then flow into a second flow path provided between an inner surface of the third filter housing and an outer surface of the second carbon block to pass through the second carbon block. Water passing through the second carbon block may flow into the inner cover through a communication hole communicating with the hollow of the second carbon block.

A first filter bracket may be coupled to the upper end of the second carbon block, the first filter bracket may be inserted into the lower end of the inner cover, and a sealing member may be inserted between the first filter bracket and the inner cover. A second filter bracket may be coupled to the lower end of the electrostatic adsorption nonwoven fabric and the third carbon block, and the second filter bracket may be seated on the upper end of the first filter bracket.

A plurality of leg parts extending along the circumference and protruding downward may be formed at the lower end of the second filter bracket, and the communication hole may be formed between the leg parts. An outer diameter of the second filter bracket may be smaller than the inner diameter of the inner cover. Water flowing into the inner cover through the communication hole may flow into a flow path provided between the outer surface of the electrostatic adsorption nonwoven fabric and the inner cover and then pass through the electrostatic adsorption nonwoven fabric and the third carbon block in order.

The electrostatic adsorption nonwoven fabric may include a plurality of convex parts convex outwardly and a concave part provided between the convex portions to be wrinkled along a circumferential direction. The electrostatic adsorption nonwoven fabric may be formed in multiple layers.

The carbon block may be formed by processing a mixture containing activated carbon and a binder. The water flowing into the filter housing may pass through the filtration member after flowing from the upper side to the lower side along the inner surface of the filter housing and exit to the outside of the filter housing while flowing from the lower side to the upper side.

A hollow inner cover for accommodating the filtration member may be disposed in the filter housing. The water flowing into the filter housing may flow from the upper side to the lower side along the inner surface of the filter housing and the outer surface of the inner member, flow into the inner member through between the lower end of the inner member and the filter housing to pass through the filtration member, and then exit to the outside of the filter housing while flowing from the lower side to the upper side.

The inflow port in which water flows may be formed in the upper center of the filter housing, and the discharge port through which the water passing through the filtration member exits may be formed on the outside of the inflow port. The water flowing into the inflow port may flow from the upper side to the lower side along an inflow path defined by the inner surface of the filter housing, and the water passing through the filtration member may flow from the lower side to the upper side along a discharge flow path positioned at the side of the center of the inflow path and then exit to the outside of the filter housing through the discharge port.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A filter module for a liquid dispensing device, the filter module comprising:
    a pre-filter including a first carbon block having a hollow shape;
    a hollow fiber membrane filter that receives water from the pre-filter; and
    a composite filter including:
        a filter housing including an inflow port and a discharge port;
        a second carbon block having a hollow shape, the second carbon block being provided in a lower space of the filter housing;
        a third carbon block having a hollow shape, the third carbon block being provided in an upper space of the filter housing;
        an electrostatic adsorption filter positioned around an outer surface of the third carbon block; and
        a first filter bracket positioned between the second carbon block and the third carbon block,
    wherein the first filter bracket defines a water passage from an inner surface of the second carbon block to an outer surface of the electrostatic adsorption filter,
    wherein the first filter bracket extends along an upper surface of the second carbon block and portions of the inner surface and an outer surface of the second carbon block,
    wherein the electrostatic adsorption filter includes a plurality of convex surfaces that are convex outwardly, and a plurality of concave surfaces that are provided between the convex surfaces and contact the outer surface of the third carbon block so that the electrostatic adsorption filter has a wrinkled shape along a circumferential direction,
    wherein a diameter of the outer surface of the second carbon block is greater than a diameter of an outer surface of the third carbon block, and the diameter of the outer surface of the second carbon block corresponds to a diameter of the outer surface of the electrostatic adsorption filter,
    wherein the electrostatic absorption filter includes a polyamine-based polymer positively charged functional group applied to a cellulose support body, and
    wherein water sequentially passes through the first carbon block, the hollow filament membrane, the second carbon block, the electrostatic adsorption filter, and the third carbon block.

2. The filter module of claim 1,
    wherein the composite filter includes an inner cover that is provided in the upper space of the filter housing, and
    wherein the electrostatic adsorption filter and the third carbon block are positioned in the inner cover.

3. The filter module of claim 2,
    wherein water flows in the third filter housing in a downward direction along a first flow path provided between an inner surface of the filter housing and an outer surface of the inner cover and then flows into a second flow path provided between the inner surface of the third filter housing and the outer surface of the second carbon block to pass through the second carbon block.

4. The filter module of claim 2,
    wherein water passing through the second carbon block flows into the inner cover through a communication hole communicating with a hollow cavity of the second carbon block.

5. The filter module of claim 4,
    wherein the first filter bracket is coupled to an upper end of the second carbon block,
    wherein the first filter bracket is inserted into a lower end of the inner cover, and
    wherein a seal is inserted between the inner cover and a section of the first filter bracket extending along the portion of the outer surface of the second carbon block.

6. The filter module of claim 5,
wherein the composite filter includes a second filter bracket that is coupled to a lower end of the electrostatic adsorption filter and the third carbon block, and
wherein the second filter bracket is seated on an upper end of the first filter bracket.

7. The filter module of claim 6,
wherein a plurality of legs extending along a circumference of the second filter bracket and protruding downward are formed at the lower end of the second filter bracket, and
wherein the communication hole is formed between the legs.

8. The filter module of claim 6,
wherein an outer diameter of the second filter bracket is smaller than an inner diameter of the inner cover.

9. The filter module of claim 6,
wherein water flowing into the inner cover through the communication hole flows into a flow path provided between the outer surface of the electrostatic adsorption filter and the inner cover and then sequentially passes through the electrostatic adsorption filter and the third carbon block.

10. The filter module of claim 1,
wherein the electrostatic adsorption filter includes multiple layers.

11. The filter module of claim 1,
wherein at least one of the first carbon block or the second carbon block includes a mixture containing activated carbon and a binder.

12. The filter module of claim 1,
wherein water flows in a downward direction along an inner surface of the filter housing before passing through the second carbon block, the third carbon block, and the electrostatic adsorption filter and exits the filter housing while flowing in an upward direction.

13. The filter module of claim 1, wherein the composite filter further includes:
a hollow inner cover that receives at least one of the third carbon block or the electrostatic adsorption filter and is provided in the filter housing.

14. The filter module of claim 13,
wherein water flowing in the filter housing sequentially flows:
in a downward direction between an inner surface of the filter housing and an outer surface of the inner cover,
into the inner cover through between a lower end of the inner cover and the filter housing,
in an upward direction to pass through the second and third carbon blocks and the electrostatic adsorption filter, and
out of the filter housing.

15. The filter module of claim 1,
wherein the inflow port is formed in an upper center of the filter housing,
wherein the discharge port is formed outside of the inflow port,
wherein water flows from the inflow port in a downward direction along an inflow path defined by an inner surface of the filter housing, and
wherein water, after passing through the second and third carbon blocks and the electrostatic adsorption filter, flows in an upward direction along a discharge flow path positioned at a side of a center of the inflow path and then exits out of the filter housing through the discharge port.

16. A water dispensing device including the filter module of claim 1.

* * * * *